US006275698B1

(12) United States Patent
Hymel

(10) Patent No.: US 6,275,698 B1
(45) Date of Patent: Aug. 14, 2001

(54) METHOD AND APPARATUS FOR PROVIDING CONTENT INFORMATION ON A ROAMING CHANNEL

(75) Inventor: James Allen Hymel, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/217,291

(22) Filed: Dec. 21, 1998

(51) Int. Cl.[7] ....................................................... H04Q 7/20
(52) U.S. Cl. .......................... 455/432; 455/432; 455/434; 455/435; 455/436; 455/466
(58) Field of Search .................................. 455/31.1, 32.2, 455/38.1, 38.4, 432–435, 466; 340/825.44, 825.25

(56) References Cited

U.S. PATENT DOCUMENTS 5,745,481 * 4/1998 Phillips et al. ......................... 370/313
6,038,549 * 3/2000 Davis et al. ............................ 705/35
6,125,262 * 8/1998 Hymel ................................. 455/38.3

* cited by examiner

Primary Examiner—Daniel Hunter
Assistant Examiner—Meless Zewdu
(74) Attorney, Agent, or Firm—Randi L. Dulaney

(57) ABSTRACT

A technique used in a subscriber unit (800) allows reception of personal messages transmitted by a home radio communication system (102,104) and content messages transmitted by a content radio communication system (106). The home and content radio communication systems (102,104, 106) share coverage areas. In the technique, at least one Block Information Word (BIW) of a frame is received on a home channel of the home radio communication system. The at least one BIW identifies a roaming pattern for the subscriber unit to use for periodically switching to a roaming channel of the content radio communication system. The subscriber unit dwells on the home channel for as many frames as have been defined by the roaming pattern, and dwells on the roaming channel for as many frames as have been defined by the roaming pattern.

19 Claims, 7 Drawing Sheets

FIG. 2 (PRIOR ART)

| LSB | BIT POSITION | | | | | | | | | | | | | | | | | | | | | MSB |
|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22...31 | 32 |
| | INFORMATION | | | | | | | | | | | | | | | | | | | | PARITY | CK |
| x x x x f f f s s s s s s s s s s s s s s | | | | | | | | | | | | | | | | | | | | | p p p p p p p p p p | p |
| 0 1 2 3 0 1 2 0 1 2 3 4 5 6 7 8 9 10 11 12 13 | | | | | | | | | | | | | | | | | | | | | | |

FIG. 3

| LSB | BIT POSITION | | | | | | | | | | | | | | | | | | | | | MSB |
|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22...31 | 32 |
| | INFORMATION | | | | | | | | | | | | | | | | | | | | PARITY | CK |
| x x x x f f f i d d d d d d d d d d d d t t t t | | | | | | | | | | | | | | | | | | | | | p p p p p p p p p p | p |
| 0 1 2 3 0 1 2 0 1 2 3 4 5 6 7 0 1 2 3 | | | | | | | | | | | | | | | | | | | | | | |

METHOD AND APPARATUS FOR PROVIDING CONTENT INFORMATION ON A ROAMING CHANNEL

FIELD OF THE INVENTION

This invention relates in general to communication systems and devices and in particular to a method and apparatus for providing content information on a roaming channel.

BACKGROUND OF THE INVENTION

Communication devices such as pagers using present day technology have the capability of receiving content information (e.g., advertisements, news, sports information, and other types of information) besides the traditional personal messages received by pagers. Advanced communication protocols such as the FLEX' communication protocol, developed by Motorola, Inc., supports such advanced features as multi-frequency multi-area paging systems which allow pagers to roam from one geographical area to another.

The FLEX' communication protocol is a synchronous time slot protocol tied to an accurate time reference. Each address in a pager is assigned a base frame in the set of 128 frames appearing on a channel during each 4-minute cycle. FLEX frames are transmitted at 32 frames per minute (1.875 seconds per frame). An hour is divided into 15 FLEX cycles numbered 0 to 14. A discussion of the FLEX communication protocol for example can be found in U.S. Pat. No. 5,555,183 entitled "Method and Apparatus for Synchronous Selective Call Signal", which is hereby incorporated by reference.

With the advent of such sophisticated communication protocols, service providers are becoming very interested in providing content information such as advertising, news, sports and other types of information to their subscribers. Service providers such as paging service providers see this as an added benefit that they can provide paging subscribers. It is also foreseeable that some service providers may attempt in the future to lower the price they charge subscribers by transmitting advertisements to their subscribers.

As providing content information becomes more popular and therefore more competitive, it will in all likelihood become dominated by a few service providers in a region with the required expertise. Rather than require that all service providers must offer the same high-quality grade of service (and incur the expense), it is realistic to assume that some service providers will sublet service from a particular content provider in their particular geographical region. The benefit is that all frequencies are not unduly burdened with the content information, while the service providers are not burdened with the cost of hiring the staff and managing the information, advertising and content feeds required to provide top quality content information to subscribers (e.g., paging service subscribers, etc.).

The FLEX paging protocol defines two methods of implementing a roaming system. The first method is called SSID (Simulcast System IDentification) roaming and is based on the pager identifying each simulcast area which is to be included in the desired roaming area. The pager contains an RF frequency list and a roaming ID list along with other information required to find and identify each simulcast system. The second method is referred to as NID (Network IDentification) roaming and is based on the pager examining RF channels for the presence of a marker (NID) carried in the address and vector fields indicating that the channel is affiliated with the desired roaming network. This type of roaming is better suited for large, possibly global, coverage areas where it would be impractical to store in the pager every possible Simulcast System IDentification making up the desired total coverage area.

Although multi-frequency pagers and other types of communication devices may be able to scan to one particular advertising/content channel in order to pick up advertisement and/or other types of content information for the subscriber unit, a major problem that exists is that while a pager is roaming to the "advertising channel", it may miss personal messages being sent from its "home" paging system. A need thus exists in the art for a method and apparatus for providing content information, which can solve the above-mentioned problem.

BRIEF DESCRIPTION OF THE DRAWINGS

FIG. 2 shows a bit diagram of a prior art optional Block Information Word (BIW).

FIG. 3 shows a bit diagram of a Content Block Information Word (CBIW), in accordance with the preferred and a first alternative embodiment of the present invention.

DESCRIPTION OF THE PREFERRED EMBODIMENT

Figure 1:
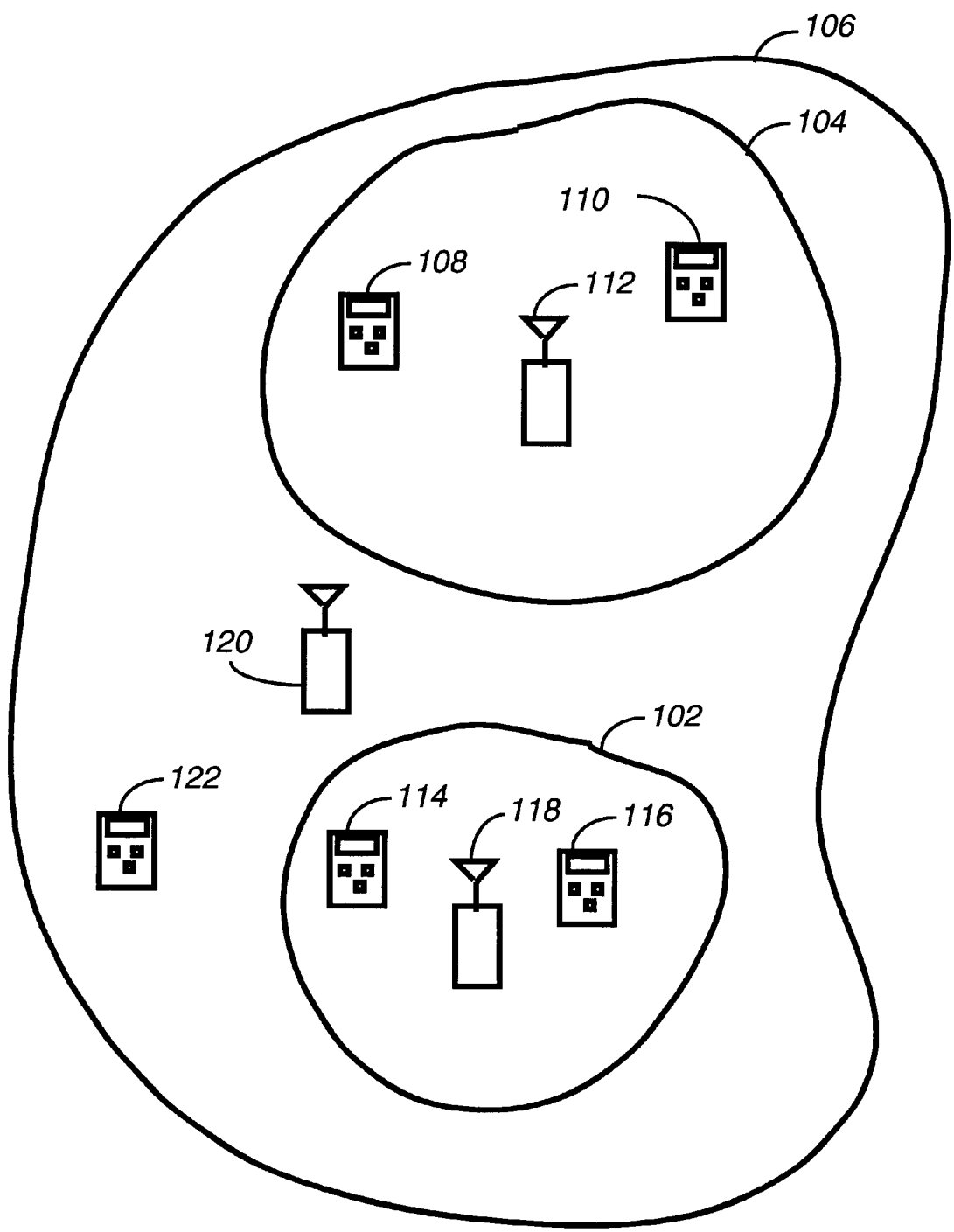
FIG. 1 shows a block diagram of a communication system, in accordance with the preferred, first, and second alternative embodiments of the present invention.

Referring now to the drawings and in particular to FIG. 1, a communication system such as a paging system includes home FLEX™ communication systems 102, 104 that provide service to different geographical areas. Home FLEX™ paging communication systems 102, 104 and content FLEX™ communication system 106 can be operated by different paging service providers. Subscriber units, or pagers, 108 and 110 receive messages from fixed network 112 on frequency "$f_2$", their home system, while pagers 114 and 116 receive messages from fixed network 118 on frequency "$f_1$", their home system. In accordance with the present invention, a third communication system ("the content provider system or roaming communication system") 106 provides content information to subscriber units 108–116 located in communication systems 102 and 104 via fixed network 120 on frequency "$f_3$". The communication system 106 also provides both content information and messaging service to the subscriber unit 122, which operates in communication system 106. In accordance with one aspect of the invention, subscriber units 108–116 leave their respective home systems 102 and 104 periodically and roam to frequency "$f_3$" in order to receive particular content information from paging system 106 and then return to their respective home systems 102 and 104. The messages received by subscriber units 108–116, 122 that are addressed specifically to the respective subscriber units are designated as "personal" messages to distinguish them from the content type messages that are distributed in communication system 106, notwithstanding the fact that the personal messages may not be personal in all senses of the word. Personal messages could include, for example, group call messages.

The FLEX communication protocol supports a mandatory Block Information Word (BIW), BIW number 1, and "optional" BIWs, numbers 2, 3, and 4, each of which are 32 bits long. BIW 1 is always sent as the initial BIW in a frame. BIW number 1 is used to inform communication devices of their frame latency (which frames to decode, also referred to as "collapse"), number of priority address words, and other critical information. The optional BIWs are located in the first interleaved block of a FLEX frame. In existing roaming systems, the optional BIWs contain such system information as Simulcast System IDentification (SSID), local ID, Coverage Zone, Country Code, and Traffic Management Flags. In such existing systems, this information is used by each subscriber unit to make decisions that determine which channel to switch to in order to receive all the messages that are addressed to the subscriber unit. In such roaming systems, the subscriber unit may temporarily scan several channels while it is determining which channel to select for receiving all of its messages, but it will typically select one channel to remain at while the subscriber unit is within a coverage area.

In accordance with the preferred embodiment of the present invention, the FLEX™ communication protocol is modified in order to support "content block information words" (hereinafter "CBIWs"). The CBIWs are a subset of the optional BIWs that let pagers 110–116 know when to switch ("roam") to frequency $f_3$ from their respective home frequencies, $f_1$ for pagers 114 and 116 and frequency $f_2$ for pagers 108 and 110, in order to receive content information. The CBIWs also let the pagers know how long (number of frames) to stay receiving information from the content provider system 106.

In FIG. 2, there is shown a prior art optional BIW. Bits 1–4 ($X_0$, $X_1$, $X_2$, $X_3$) comprise a standard 4-bit check character. Bits 5–7 ($f_0$, $f_1$, $f_2$) are the word format type bits which determine what type of data is being provided by the BIW (e.g., Local ID/time Zone or Month/DayNear or Second/Minute/Hour, etc.). Bits 8–21 ($s_0$–$s_{13}$) are the data bits, while bits 22–31 ($p_0$–$p_9$) are the parity bits and bit 32 is the check parity bit.

In accordance with the preferred and a first alternative embodiment of the present invention, CBIWs as shown in FIG. 3 are generated using the 2nd, 3rd or 4th optional BIWs. The CBIWs are used to convey the starting frame number, frame count and advertising management flags needed to allow a pager to leave its home system 102, 104 and go to system 106 to receive content information and then return to the home system 102, 104. The CBIW shown in FIG. 3 includes the following bits:

Bits 1–4 ($X_0$, $X_1$, $X_2$, $X_3$) comprise a standard 4-bit check character;

Bits 5–7 ($f_0$, $f_1$, $f_2$) are word format type bits, which identify the BIW as a CBIW;

Bits 8–9 ($i_0$, $i_1$) are information bits, which identify the CBIW as $1^{st}$, $2^{nd}$, or $3^{rd}$ CBIW;

Bits 10–17 ($d_0$–$d_7$) are frame count bits that identify a starting frame number and the number of frames to dwell on the roaming and home channels, using at least two or three CBIWs;

Bits 18–21 are AMF (Advertising Management Flag) bits ($t_0$–$t_3$);

Bits 22–31 ($p_0$–$p_9$) are parity bits; and

Bit 32 is a check parity bit.

The AMF (Advertising Management Flag) bits ($t_0$–$t_3$) are used to inform a subscriber unit that is otherwise enabled for content roaming whether it is in a group of subscriber units that is directed to perform content roaming, or whether it is prevented from performing content roaming. A subscriber unit responds to a shift in the AMF bits so that it will begin to search alternate RF channels, in this particular case the content channel on frequency $f_3$. A subscriber unit is predeterminedly assigned to one of four groups, each group being indicated by one of the four AMF bits. The predetermined assignment is preferably made by using the last two bits of the subscriber's electronic serial number to identify one of the four AMF bits, but other techniques are equally effective. In accordance with the preferred embodiment of the present invention, when the subscriber unit's group bit is a one, the subscriber unit does not perform content roaming, and when the subscriber unit's group bit is changed to a zero, the subscriber unit begins content roaming. This approach allows the service provider of the home channel to shift any number from one to four of four approximately equal portions of all the subscriber units authorized to roam into the roaming mode, which gives the service provider flexibility to reduce roaming traffic so as to avoid delaying personal messages should that type of traffic become heavy. During the time that a particular subscriber unit has left its home channel to collect content information, the home service provider will refrain from sending messages to it until it returns.

Figure 4:
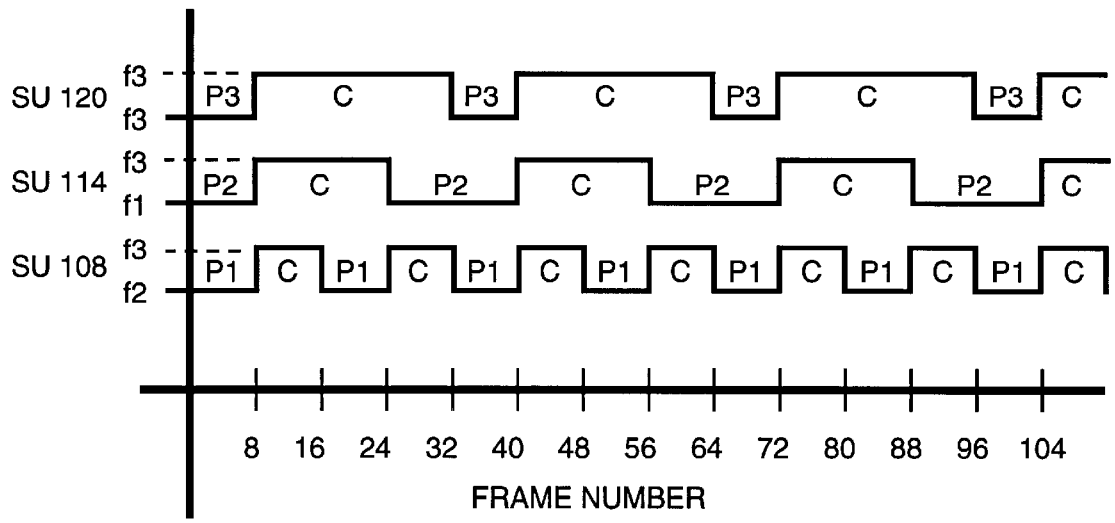
FIG. 4 shows a timing diagram of the communication system, in accordance with the preferred embodiment of the present invention.

In accordance with the preferred embodiment of the present invention, two CBIWs are transmitted by the home system 102 or home system 104 in order to inform selected groups of pagers operating in the home system to roam to the content provider system 106 and receive content information. The first CBIW provides in the frame count bits ($d_0$–$d_7$) the starting frame number in which the select groups of pagers in the system are to roam to the content provider system 106. The second CBIW provides in the frame count bits ($d_0$–$d_7$) the number of frames for which the pagers are to stay receiving information on the content provider system 106 on frequency $f_3$. This value can be from 0–128 frames. If the value is 64 or less and the starting frame number is sufficiently small, then the pager will switch between its home system 102 or 104 and the content provider system 106, starting at the starting frame number and dwelling on the home channel and the roaming channel for the identified number of frames. This is illustrated in FIG. 4, which shows an example of the switching of subscriber unit 108 (in system 102) between $f_2$ and $f_3$ after having received a starting frame number of 8 and a number of frames to dwell of 8 in two CBIWs. Subscriber unit 108 receives personal messages P1 while on its home channel $f_2$, and receives a portion of the content information, indicated by C in FIG. 4 while on the roaming channel $f_3$. It will be also be observed from FIG. 4 that personal messaging information P3 is transmitted to subscriber units that use $f_3$ as their home channel, such as subscriber unit 122, during frames 0–8, 32–40, 64–72, etc., and that content information C is transmitted during the intervening frames. Also illustrated in FIG. 4 is an example of the switching of subscriber unit 114 (in system 104) between $f_1$ and $f_3$ after having received a starting frame number of 8 and a number of frames to dwell of 16 in two CBIWs. Subscriber unit 114 receives personal messages P2 while on its home channel $f_1$, and receives a portion of the content information, indicated by C in FIG. 4, while on the roaming channel $f_3$.

Figure 5:
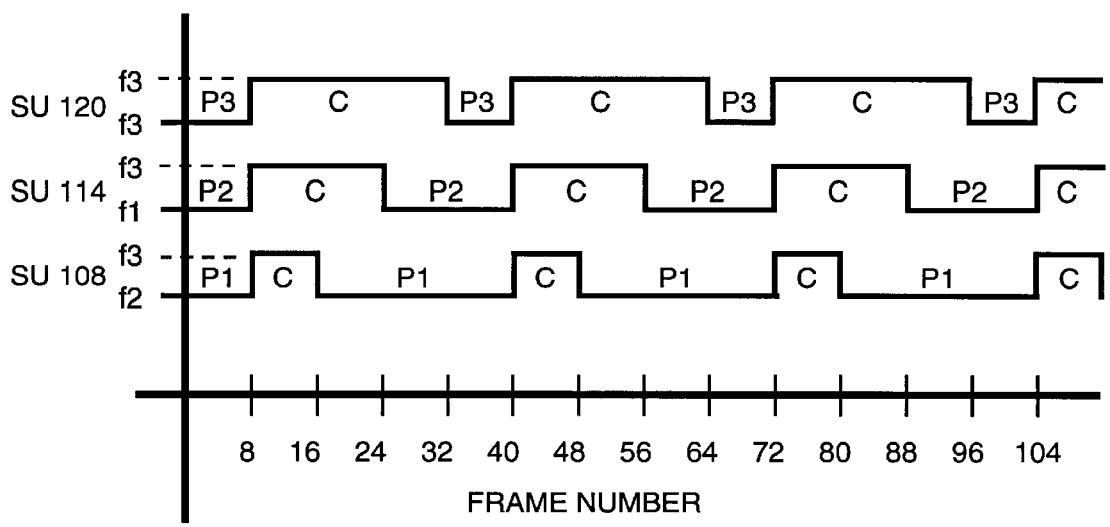
FIG. 5 shows a timing diagram of the communication system, in accordance with the first alternative embodiment of the present invention.

In accordance with the first alternative embodiment of the present invention, three CBIWs are transmitted by the home system 102 or home system 104 in order to inform select groups of pagers operating in the home system to roam to the content provider system 106. The first CBIW provides the starting frame number in the frame count bits. The second CBIW provides a first number of frames to dwell on the roaming channel. The third CBIW provides a second number of frames to dwell on the home channel. This is illustrated in FIG. 5, which shows an example of the switching of subscriber unit 108 (in system 102) between $f_2$ and $f_3$ after having received a starting frame number of 8, a number of frames to dwell on the roaming channel of 8, and a number of frames to dwell on the home channel of 24. Subscriber unit 108 receives a portion of the content information indicated by C in FIG. 5 while on the roaming channel $f_3$. Also illustrated in FIG. 5 is an example of the switching of subscriber unit 114 (in system 104) between $f_1$ and $f_3$ after having received a starting frame number of 8, a number of frames to dwell on the home of 16, and a number of frames to dwell on the home channel of 16, in three CBIWs. Subscriber unit 114 receives personal messages P2 while on its home channel $f_1$, and receives a portion of the content information, indicated by C in FIG. 4, while on the roaming channel f3. The CBIWs can thus be said to define a roaming pattern for the subscriber unit.

It will be appreciated that, in accordance with the preferred or first alternative embodiment of the present invention, when the last frame of a cycle is reached, the subscriber unit switches back to its home channel if it is not already on its home channel and awaits another set of CBIWs directing it to roam to the content provider roaming channel. In another alternative, the subscriber unit retains a roaming pattern previously received and uses the starting frame number to resume the roaming cycle, which is followed until it is superseded by a new one or a roaming pattern that indicates that no roaming is to take place (e.g., by setting all AFM bits to the non-roaming state). It will be appreciated that other techniques exist to indicate the periodic switching between the home and roaming channel. For example, in the first alternative embodiment of the present invention, the number of frames to dwell while in the roaming and home channels could be indicated by sending a number of total frames for each cycle, as well as the number of frames to dwell in either the roaming or home channel, but not both. Furthermore, in accordance with the first alternative embodiment of the present invention, the starting frame number, the number of frames to dwell on the roaming channel, and the number of frames to dwell on the home channel could be indicated with two CBIWs instead of three, by putting restrictions on the magnitude of the starting frame and the number of frames to dwell on the roaming and home channels, thereby reducing the number of frame count bits needed to transfer the information. For example, if the starting frame were restricted to frame numbers 0–16, and the numbers of frames to dwell for the roaming and home channels were each restricted to 64, then the sixteen bits required could be transferred in two CBIWs. As another example, the AMF bits in the second CBIW could be used to convey some of the dwell information.

Figure 6:
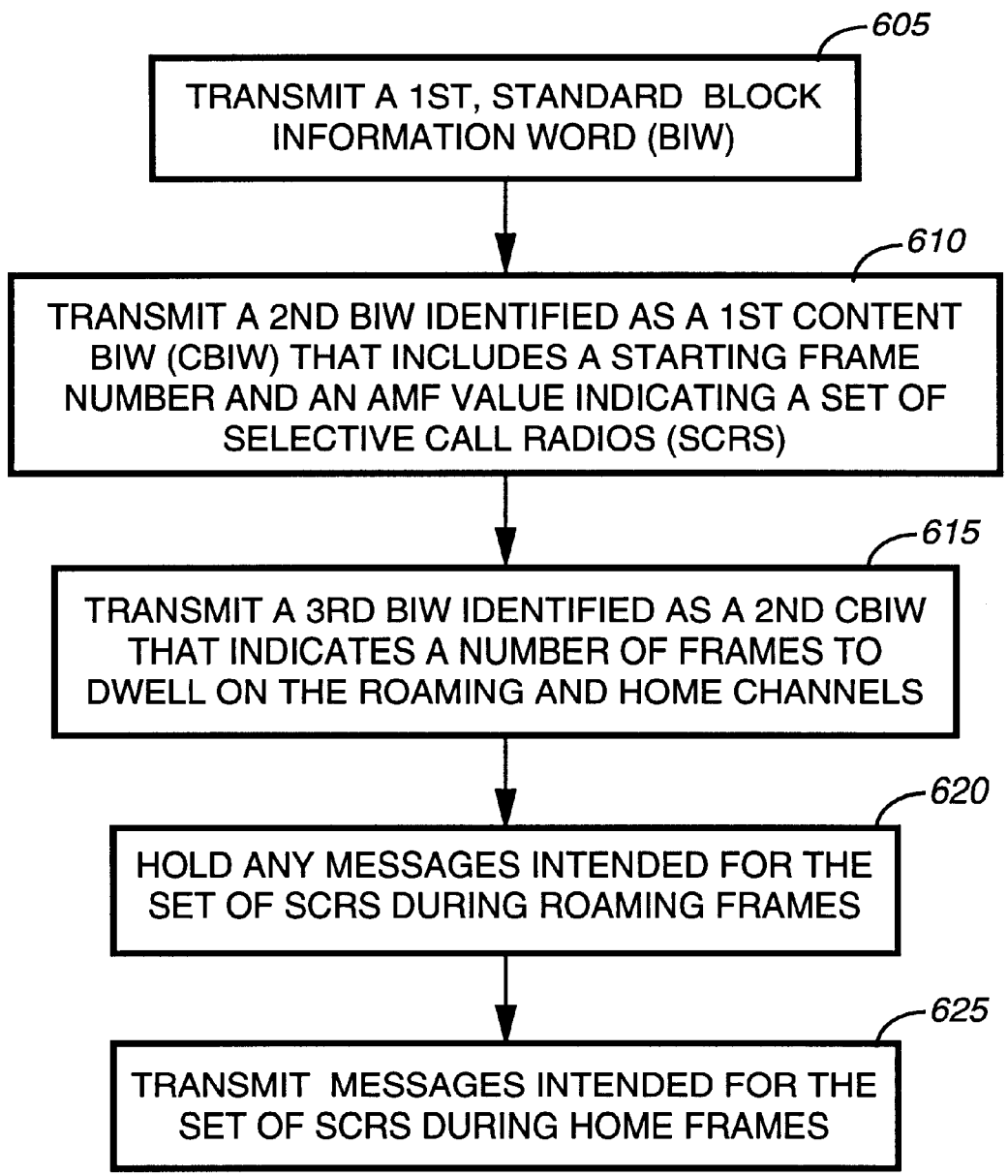
FIG. 6 shows a flow chart of a technique used in a terminal of the communication system, in accordance with the preferred embodiment of the present invention.
Figure 7:
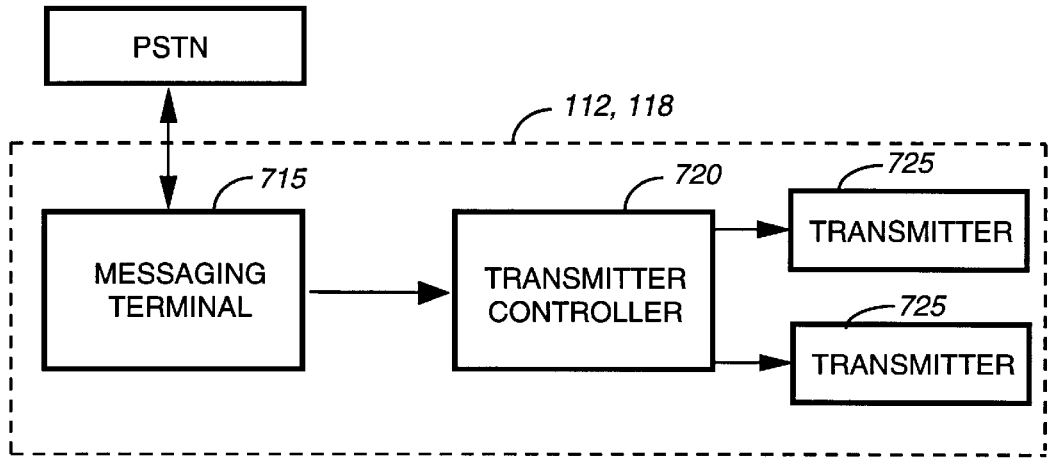
FIG. 7 shows an electronic block diagram of a messaging terminal used in the communication system, in accordance with the preferred and first alternative embodiments of the present invention.

Referring now to FIG. 6, a flow chart of a method used in a messaging terminal 715 (FIG. 7) of the communication system is shown in accordance with the preferred embodiment of the present invention. As shown in FIG. 7, the messaging terminal 715 is a portion of each of the fixed network 112,118 shown in FIG. 1. It will be appreciated that functions of the fixed network 112,118 include switched telephone network interconnect functions, messaging functions, radio transmitter/receiver control functions, and radio frequency transmission and reception functions. The fixed networks 112,118, and 120 comprise the messaging terminal 715, a transmitter controller 720, and transmitters 725, in addition to other equipment not shown in FIG. 7. The transmitter controller 720 and the transmitters 725 are conventional transmitters, such as the RF-Conductor! model transmitter controller and Nucleus®-Orchestra! model transmitter manufactured by Motorola, Inc. of Schaumburg, Ill. The messaging terminal 715 is preferably a conventional Motorola model WMG™-Administrator! messaging terminal having segments of program instructions that have been uniquely modified and added to the already existing programming instructions, and that provide the unique functions described herein. At step 605, the messaging terminal 715 transmits a first, standard, block information word (BIW) of a frame. As used in the description of FIG. 6, the word transmit means that the messaging terminal 715 formulates the necessary commands to cause one of the radio transmitters 725 to transmit the portion of the FLEX™ protocol described. It will be appreciated that the fixed network can alternatively be comprised of other conventional equipment, and that in some instances the unique functions of the messaging terminal 715 described herein can be split amongst more than one piece of fixed network equipment. At step 610, the messaging terminal 715 transmits a second BIW that is a first CBIW. Bits 5–7 of the second BIW indicate that it is a CBIW. Information bits 8–9 identify the CBIW as a $1^{st}$ CBIW. Bits 10–17 identify a starting frame number, and bits 18–21 provide an AMF value that indicates which groups of subscriber units are to go into the content roaming mode. At step 615, the subscriber unit receives a third BIW that is identified by bits 8–9 as the second CBIW, and that identifies in bits 10–17 the number of frames to dwell on the roaming and the home channels. At step 620, the messaging terminal 715 holds all messages received by messaging terminal 715 for delivery on the home channel (referred to as personal messages), scheduling them for delivery to the subscriber unit in a later frame during which the subscriber unit is scheduled to be back on the home channel. At step 625, the protocol has advanced to the frames during which the subscriber unit was scheduled to have returned to the home channel, and the messages that were held and scheduled for that time are transmitted.

Figure 8:
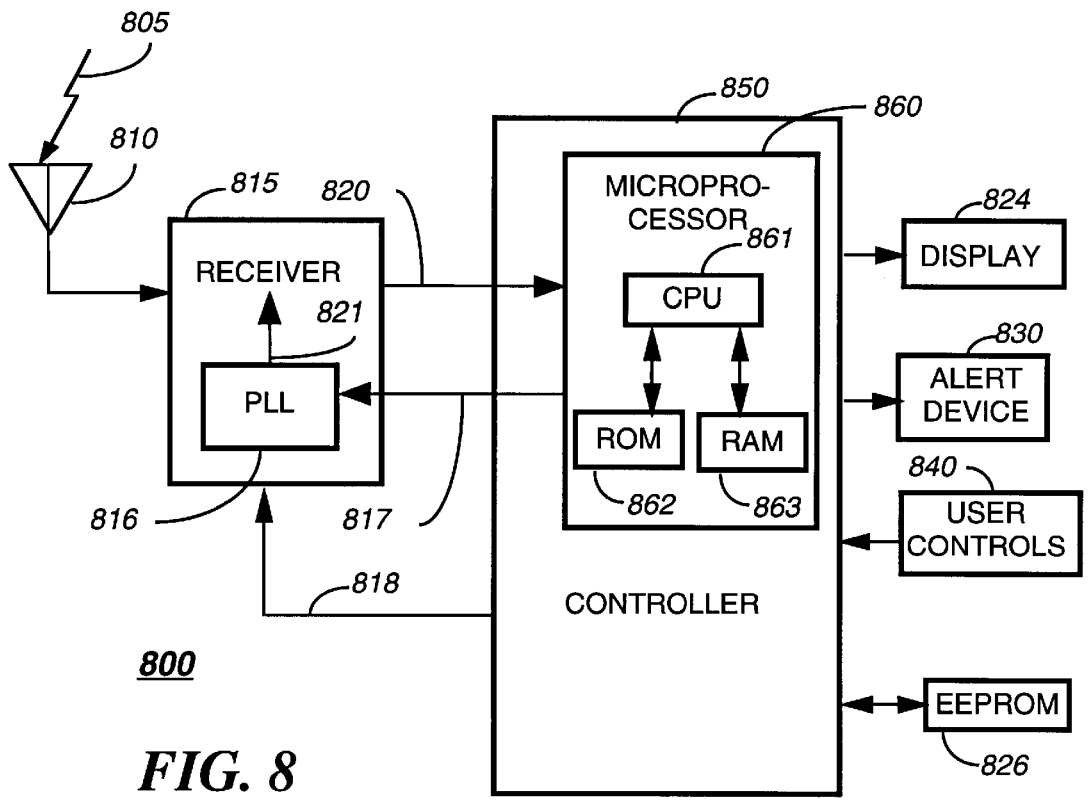
FIG. 8 shows an electronic block diagram of a subscriber unit used in the communication system, in accordance with the preferred, first, and second alternative embodiments of the present invention.

Referring to FIG. 8, an electrical block diagram of a multichannel subscriber unit 800 is shown, in accordance with the preferred, first, and second alternative embodiments of the present invention. The subscriber unit 800 is representative of subscriber units 108, 110, 114, and 116. The subscriber unit 800 comprises a receiver 815 and a controller 850. A conventional antenna 810 intercepts radiated radio frequency (RF) signals 805 that are converted by the antenna 810 to conducted RF signals that are coupled to the receiver 815. The receiver 815 performs conventional receiving functions of filtering unwanted energy from the RF signal, converting the RF signal, and generating a demodulated signal 820 that is coupled to the controller 850, using a conventional phase lock loop 816 to generate a local oscillator signal. The controller 850 generates an input control 817 that is coupled to the phase lock loop 816. The controller 850 is also coupled to a display 824, an alert 830, a set of user controls 840, and an electrically erasable read only memory (EEPROM) 826. The controller 850 comprises a microprocessor 860, as well as other circuits not shown in FIG. 1, such as power regulation circuits. The controller 850 is also coupled to the receiver 815 by a power control signal 818 that switches the receiver off during certain frames when the controller 850 has the receiver 815 tuned to a home channel. This is for conventional battery savings purposes.

The microprocessor 860 is coupled to the EEPROM 826 for storing an embedded address and other configuration information that is stored therein during a maintenance operation, and the microprocessor 860 loads the embedded address during normal operations of the subscriber unit 800. The microprocessor 860 is a digital signal processor of conventional circuit design, comprising a central processing unit (CPU) 861, a read only memory (ROM) 862, and a random access memory (RAM) 863.

A conventional message processor function of the microprocessor 860 decodes an outbound selective call message, generating data words that have been coded within an outbound signaling protocol conveyed by the radio signal 805, and processes an outbound selective call message when an address received in an address field of the outbound signaling protocol matches the embedded address stored in the EEPROM 826, in a manner well known to one of ordinary skill in the art for a subscriber unit. An outbound selective call message that has been determined to be for the subscriber unit 800 by the address matching is processed by the message processor function according to the contents of the outbound message and according to modes set by manipulation of the set of user controls 840, in a conventional manner. An alert signal is typically generated when an outbound message includes user information. The alert signal is coupled to the alert device 830, which is typically either an audible or a silent alerting device.

Figure 9:
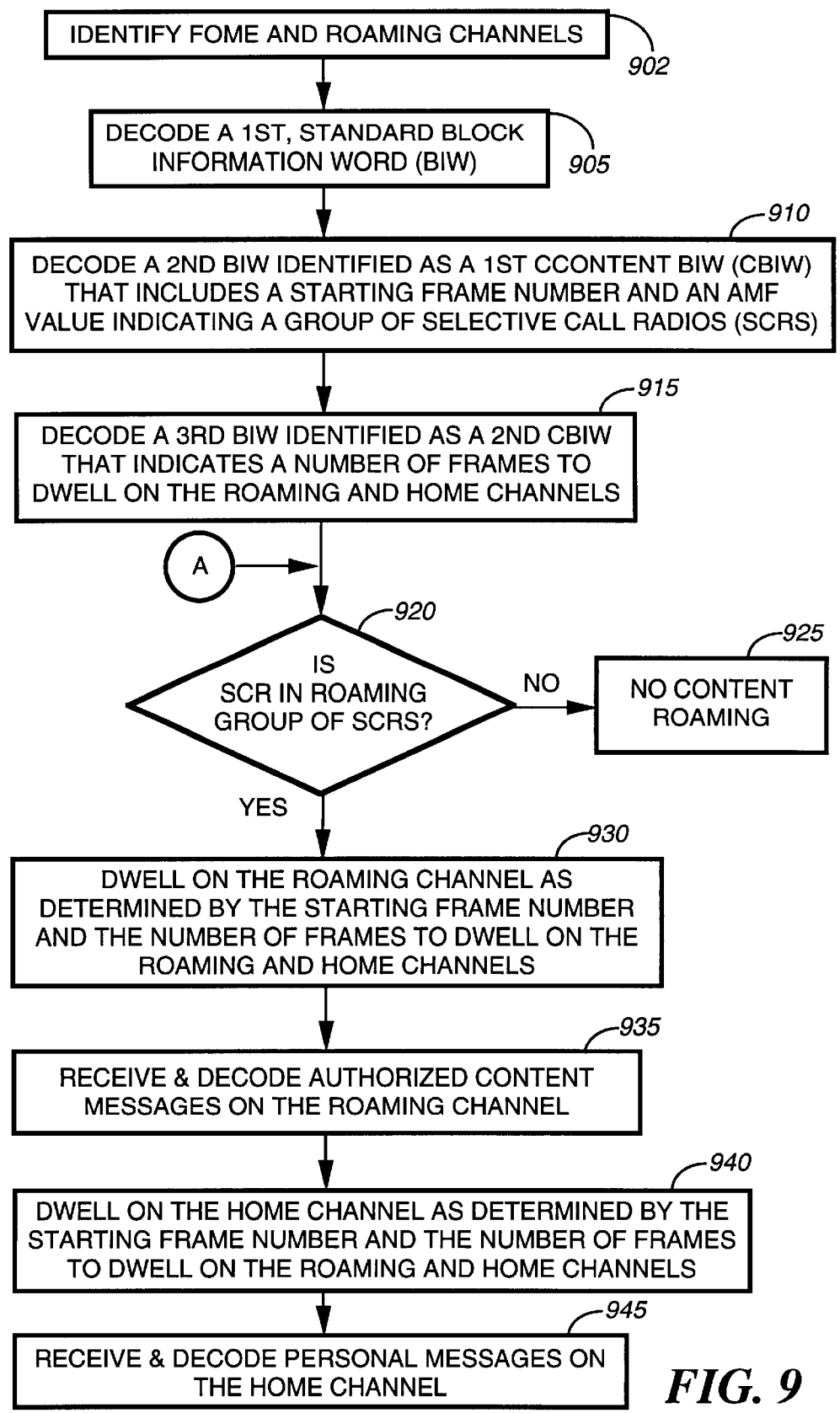
FIG. 9 shows a flow chart of a technique used in the subscriber unit of the communication system, in accordance with the preferred and first alternative embodiments of the present invention.

The subscriber unit 800 is preferably a conventional model Pagewriter™ 2000 pager made by Motorola, Inc. of Schaumburg, Ill., except that firmware in the ROM 862 is modified to have unique segments of firmware comprising unique combinations of conventional programming instructions that control the CPU 861, and therefore the controller 850 and the subscriber unit 800 to perform the unique operations described herein, in particular with reference to FIG. 9. The subscriber unit 800 can alternatively be one of many different conventional models of selective call radios that are designed to operate on a FLEX™ communication system. For those selective call radios that are controlled by a CPU, their programming instructions must be modified to provide the unique functions described herein. For those that are state machines, the logic of their controller must be modified to provide the unique functions described herein. The techniques for making such modifications are well known to one of ordinary skill in the art. The description "subscriber unit" is a convenient name for a selective call radio and is not intended to restrict the subscriber unit 800 only to radios for which the service is user paid. For example, the radio may one of many radios owned by a business that operates an entire communication system.

Referring now to FIG. 9, a flow chart of a technique used in the subscriber unit 800 to perform content roaming is shown, in accordance with the preferred and first alternative embodiments of the present invention. At step 902, the subscriber unit 800 identifies a home and a roaming channel in a conventional manner, such as from stored parameters or values received over the air. At step 905, a first, standard BIW is received by the receiver 815 and decoded by the controller 850. The information in this BIW is used by the controller 850 in a conventional manner. At step 910, the subscriber unit 800 receives and the controller 850 decodes a second BIW and identifies it as a first CBIW from bits 5–9. Having determined that a first CBIW is included in the frame, the controller 850 decodes a starting frame number from bits 10–17, and decodes the AMF bits 18–21. The subscriber unit proceeds to step 915, wherein the subscriber unit receives and decodes a third BIW that is a second CBIW that includes frame count bits that indicate a number of frames to dwell on the roaming and home channels. At step 920, when the controller 850 makes a determination that an AMF bit corresponding to the subscriber unit 800 is in a state that indicates that the particular subscriber unit 800 should not perform content roaming, the technique ends at step 925, with the controller 850 keeping the subscriber on the home channel. When the controller 850 makes a determination that an AMF bit corresponding to the subscriber unit 800 is in a state that indicates that the subscriber unit 800 should perform content roaming at step 920, the controller 850 switches the receiver 815 to the roaming channel at the starting frame number, and keeps the receiver on the roaming channel (dwells there) for the number of frames to dwell decoded from the second CBIW. While dwelling on the roaming channel, messages are received when the subscriber unit is authorized to receive a maildrop address of a message received and decoded on the roaming channel, but without using a received selective call address to determine that such a mail drop message is intended for the subscriber unit 800. Furthermore, the power control signal 818 keeps the receiver 815 powered on. When the receiver 815 is on the roaming channel, the subscriber unit receives frames and the decoder 850 decodes authorized content messages from the roaming channel frames at step 935. When the subscriber unit 800 has finished dwelling on the roaming channel, the controller 850 switches the receiver 815 to the home channel at step 940, and dwells there for the number of frames to dwell. During the time the subscriber unit 800 dwells on the home channel, personal messages for the subscriber unit 800 are received by the receiver 815 and decoded by the controller 850, at step 945. The controller 850 continues to switch the receiver 815 between the roaming channel and the home channel until the end of the frame, then starts roaming again at the starting frame number at step 930, unless new CBIW's are received at steps 910 and 915.

It will be appreciated that the above steps can be performed in other orders without affecting the outcome. For example, step 920 could be performed before step 915.

Figure 10:
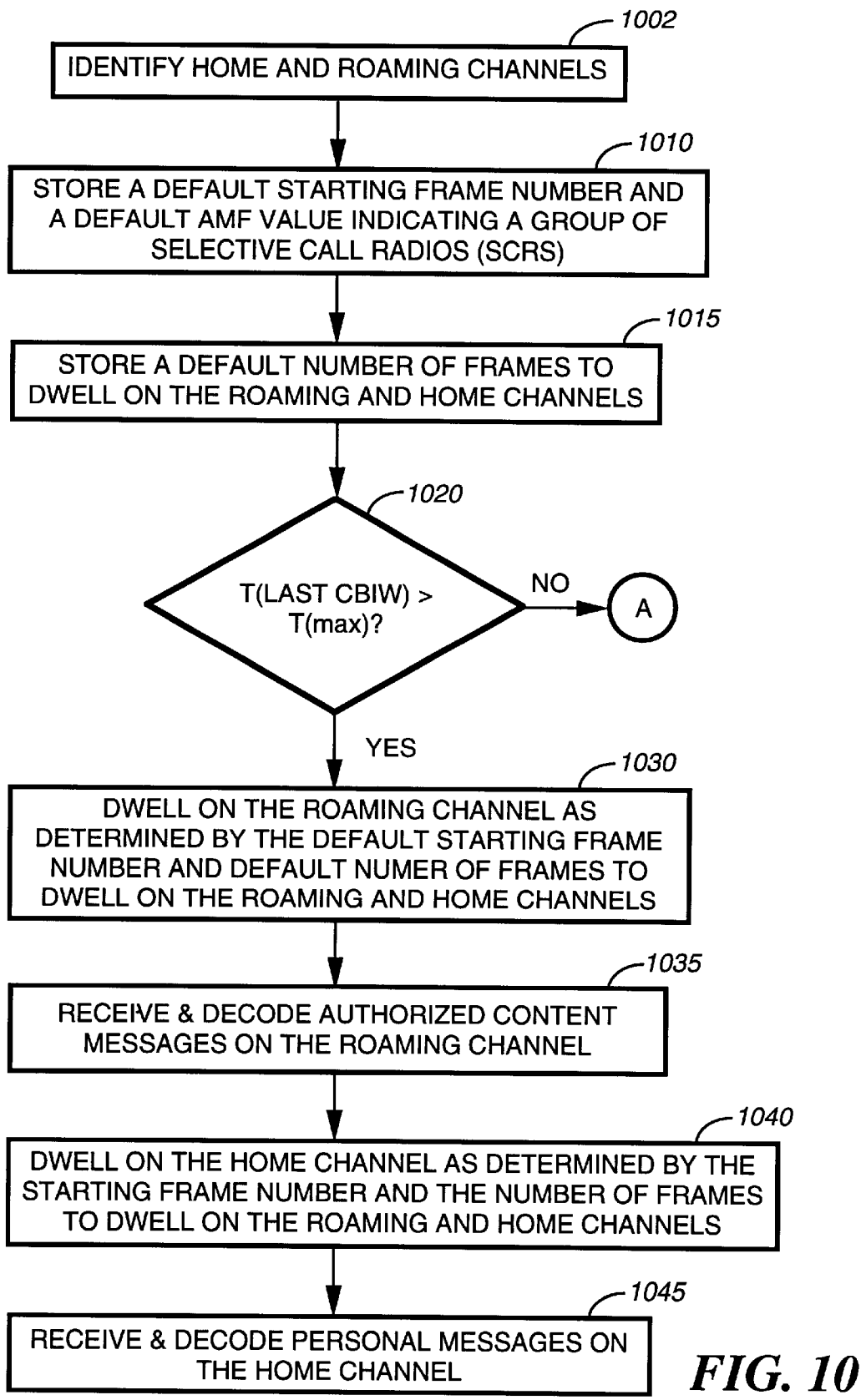
FIG. 10 shows a flow chart of a technique used in the subscriber unit of the communication system, in accordance with the second alternative embodiment of the present invention.

Referring now to FIG. 10, a flow chart of a technique used in the subscriber unit 800 to perform content roaming is shown, in accordance with a second alternative embodiment of the present invention. At step 1002, the subscriber unit 800 identifies a home and a roaming channel in a conventional manner, as described above with reference to FIG. 9, step 902. At step 1010 a default starting frame number and a default AMF value are stored in the subscriber unit 800, preferably in the EPROM memory 862 during a maintenance operation such as during a maintenance shop operation or during an over the air reprogramming operation. At step 1015, default frame count bits that indicate a number of frames to dwell on the roaming and home channels are likewise stored in the subscriber unit 800. At step 1020, the controller 850 makes a determination whether a time, TIME (Last CBIW), exceeds a predetermined criterion, TIME (max). TIME(Last CBIW) is the time from the receipt of the last valid CBIW that contains a starting frame number, or an AMF value, or a number of frames to dwell on the roaming and home channels. When the controller 850 makes a determination that the time does not exceed the criterion, the controller 850 controls the receiver 815 according to the technique described with reference to FIG. 9 at steps 920, 925, 930, 935, 940, and 945. When the controller 850 makes a determination that the time does exceed the criterion (which criterion also includes a situation wherein the subscriber unit 800 has never received a starting frame number, or an AMF value, or a number of frames to dwell on the roaming and home channels), the controller 850 controls the receiver 815 at steps 1030, 1035, 1040, and 1045, to switch to the default roaming channel at the starting frame number, and switches the receiver 815 between the roaming channel and the home channel until the end of the frame, then starts roaming again at the starting frame number, in the same manner as described above with reference to FIG. 9 for steps 930, 935, 940, and 945, except that the default values for the starting frame number, the AMF value, and the number of frames to dwell on the roaming and home channels are used. By using the default values as described herein, content roaming can be performed without over the air commands. This is useful for situations wherein the content roaming feature is not yet programmed into the fixed network, or wherein the network operator determines that such reprogramming of the fixed network can be avoided because the use of default values achieves a sufficient level of performance for content users of his system.

By now, it should be appreciated that a method and apparatus has been described for commanding subscribers units to perform dynamic roaming. In contrast to prior art techniques, the new technique described herein is a technique for a messaging terminal to dynamically command the subscriber units to roam during portions of a frame, and allowing changes to the amount of roaming that is permitted, on a frame by frame basis, if need be. The subscriber unit uniquely accepts these commands and roams periodically, according to the commands. The subscriber unit remains powered up and accepts messages during the roaming frames, irrespective of decoding its own address from the BIW of the roaming channel, but responsive to a maildrop of the message being an authorized maildrop for the subscriber unit. This contrasts with prior art roaming techniques in which a subscriber unit uses static information to change home channels on a static basis, and operates under standard message addressing rules and power savings rules when on a home channel determined by conventional roaming techniques.

While a preferred and first alternative embodiment of the invention have been illustrated and described, it will be clear that changes, variations, substitutions and equivalents will occur to those skilled in the art without departing from the spirit and scope of the present invention as defined by the appended claims.

I claim:

1. A method used in a subscriber unit to receive personal messages transmitted by a home radio communication system and content messages transmitted by a content radio communication system, wherein the home and content radio communication systems share a coverage area, the method comprising the steps of:

receiving at least one Block Information Word (BIW) of a frame on a home channel of the home radio communication system, wherein the at least one BIW identifies a roaming pattern for the subscriber unit to use for periodically switching to a roaming channel of the content radio communication system;

dwelling on the home channel for a first number of frames defined by the roaming pattern; and dwelling on the roaming channel for a first number of frames defined by the roaming pattern.

2. The method according to claim 1, further comprising the steps of:

performing power saving cycling while on the home channel according to a power saving schedule defined by a combination of values stored in the subscriber unit and values received in a first BIW™ of a frame received on the home channel; and remaining in a continuous receive power mode while on the roaming channel.

3. The method according to claim 1, further comprising the step of:

accepting messages while on the roaming channel irrespective of addressing information included in a first BIW of a frame transmitted on the roaming channel.

4. A subscriber unit that allows reception of personal messages transmitted by a home radio communication system and content messages transmitted by a content radio communication system, wherein the home and content radio communication systems share a coverage area, the subscriber unit comprising:

a receiver that receives at least one Block Information Word (BIW) of a frame on a home channel of the home radio communication system, wherein the at least one BIW identifies a roaming pattern for the subscriber unit to use for periodically switching to a roaming channel of the content radio communication system;

a controller, coupled to the receiver, that controls the subscriber unit to:

dwell on the home channel for a first number of frames defined by the roaming pattern; and dwell on the roaming channel for a second number of frames defined by the roaming pattern.

5. The subscriber unit according to claim 4, wherein the controller further controls the subscriber unit to:

perform power saving cycling while on the home channel according to a power saving schedule defined by a combination of values stored in the subscriber unit and values received in a first BIW of a frame received on the home channel; and remain in a continuous receive power mode while on the roaming channel.

6. The subscriber unit according to claim 4, wherein the controller further controls the subscriber unit to:

accept messages while on the roaming channel irrespective of addressing information included in a first BIW of a frame transmitted on the roaming channel.

7. A method used in a messaging terminal of a home radio communication system to receive messages by subscriber units transmitted by a content radio communication system, wherein the home and content radio communication systems share a coverage area, the method comprising the steps of:

transmitting at least one Block Information Word (BIW) of a frame on a home channel of the home radio communication system, wherein the at least one BIW identifies a roaming pattern for a set of subscriber units assigned to the home channel to use for periodically switching to a roaming channel of the content radio communication system;

holding messages intended for the set of subscriber units during times identified for the set of subscriber units to roam; and transmitting messages intended for the set of subscriber units during times identified for the set of subscriber units to be on the home channel.

8. The method according to claim 7, wherein the at least one BIW identifies a starting frame number.

9. The method according to claim 7, wherein the at least one BIW is one of a 2nd, 3rd, or 4th BIW.

10. The method according to claim 8, wherein the home radio communication system uses Network IDentification (NID), and wherein the starting frame number is greater than eight.

11. The method according to claim 8, wherein the home radio communication system uses Simulcast System IDentification (SSID), and wherein the starting frame number is greater than four.

12. The method according to claim 7, wherein the at least one BIW identifies a number of frames to dwell on at least one of the roaming channel and home channel.

13. The method according to claim 12, wherein the at least one BIW is one of a 2nd, 3rd, or 4th BIW.

14. A method used in a subscriber unit to receive personal messages transmitted by a home radio communication system and content messages transmitted by a content radio communication system, wherein the home and content radio communication systems share a coverage area, the method comprising the steps of:

storing in the subscriber unit a default roaming pattern for the subscriber unit to use for periodically switching to a roaming channel of the content radio communication system;

dwelling on the home channel for a first number of frames defined by the default roaming pattern; and dwelling on the roaming channel for a first number of frames defined by the default roaming pattern.

15. The method according to claim 14, wherein the steps of dwelling on the home channel and dwelling on the roaming channel are performed when a criterion for receiving a predetermined type of Block Information Word (BIW) of a frame on a home channel of the home radio communication system is not met.

16. The method according to claim 14, further comprising the steps of:

performing power saving cycling while on the home channel according to a power saving schedule defined by a combination of values stored in the subscriber unit and values received in a first BIW™ of a frame received on the home channel; and remaining in a continuous receive power mode while on the roaming channel.

17. A subscriber unit that receives personal messages transmitted by a home radio communication system and content messages transmitted by a content radio communication system, wherein the home and content radio communication systems share a coverage area, the subscriber unit comprising:

a memory that stores a default roaming pattern that identifies a roaming pattern for the subscriber unit to use for periodically switching to a roaming channel of the content radio communication system;

a receiver for receiving frames on a home channel of the home radio communication system; and a controller, coupled to the memory, that controls the receiver to dwell on the home channel and receive frames for a first number of frames defined by the default roaming pattern; and dwell on the roaming channel and receive frames for a second number of frames defined by the default roaming pattern.

18. The subscriber unit according to claim 17 wherein the controller controls the subscriber unit to dwell on the home channel for a first number of frames and to dwell on the roaming channel for a second number of frames when a criterion for receiving a predetermined type of Block Information Word (BIW) of a frame on the home channel is not met.

19. The subscriber unit according to claim 17, wherein the controller further controls the subscriber unit to:

perform power saving cycling while on the home channel according to a power saving schedule defined by a combination of values stored in the subscriber unit and values received in a first BIW of a frame received on the home channel; and remain in a continuous receive power mode while on the roaming channel.

\* \* \* \* \*